(12) United States Patent
O'Conor

(10) Patent No.: US 7,457,807 B2
(45) Date of Patent: Nov. 25, 2008

(54) DATA MIGRATION AND ANALYSIS

(75) Inventor: George W. O'Conor, Weston, MA (US)

(73) Assignee: Oco I, Inc., Waltham, MA (US)

( * ) Notice: Subject to any disclaimer, the term of this patent is extended or adjusted under 35 U.S.C. 154(b) by 283 days.

(21) Appl. No.: 10/755,142

(22) Filed: Jan. 8, 2004

(65) Prior Publication Data

US 2005/0165817 A1 Jul. 28, 2005

(51) Int. Cl.
*G06F 17/00* (2006.01)

(52) U.S. Cl. ..................... 707/100; 707/102

(58) Field of Classification Search .......... 707/100–102
See application file for complete search history.

(56) References Cited

U.S. PATENT DOCUMENTS

| 6,167,405 | A  | * | 12/2000 | Rosensteel et al. | ........ 707/102 |
| 6,604,110 | B1 | * | 8/2003  | Savage et al.     | ........ 707/102 |
| 7,146,399 | B2 | * | 12/2006 | Fox et al.        | ........ 709/203 |
| 7,152,074 | B2 | * | 12/2006 | Dettinger et al.  | ........ 707/102 |
| 2003/0120665 | A1 | * | 6/2003  | Fox et al.     | ........ 707/100 |
| 2004/0093344 | A1 | * | 5/2004  | Berger et al.  | ........ 707/102 |

* cited by examiner

*Primary Examiner*—Hung T Vy
(74) *Attorney, Agent, or Firm*—Ropes & Gray, LLP

(57) ABSTRACT

A data migration technique presumes a schema suitable for combining disparate data sources in a business environment. This presumptive approach to data migration permits the development of rules and libraries specifically adapted to move data from various sources into the schema, and advantageously permits formal realization of experience that has been developed over years of work in translating various data sets to the schema. As a result, data migration can become highly automated, and the timeline for migration can be reduced from months to days or hours. This approach also permits the creation of universal analytical business tools that operate from the fixed, presumptive schema.

18 Claims, 8 Drawing Sheets

DATA MIGRATION AND ANALYSIS

BACKGROUND OF THE INVENTION

1. Field of the Invention

The present invention relates to data migration, processing, and analysis in enterprise systems.

2. Description of the Related Art

One of the enduring problems of data management in an enterprise is how to usefully combine data from disparate sources. Database technology has advanced steadily in terms of access time, capacity, and robustness. However, corporations typically employ a mix of different platforms for various applications such as payroll, customer relationship management, manufacturing, inventory, finance, and so forth. Some of this results from the preservation of legacy systems, some from weak integration of various business functions, and some from outright poor planning. However, even a well-informed, corporate-wide technology acquisition may be executed as a series of best-in-class technology choices that results in a collection of different data management systems.

As a result, even small corporations or other organizations rarely have centralized access to all corporate data, and the problems grow rapidly with the scale of the organization. The concept of a data warehouse has emerged to address this problem. Generally, a data warehouse is a single data site derived from a number of different databases separated by geography, business function, and/or business unit (or other characteristics, according to the nature and purpose of the data source). Once a consolidated data warehouse is prepared, it is possible to analyze data for an entire entity, such as a corporation.

As a significant disadvantage, data consolidation has remained, to this day, a custom solution. A team of consultants or software professionals may take months to pore through source databases in order to ensure that data from different sources is consistently represented within the data warehouse. Even once an integrated schema has been devised for all of the source data, the data sources must be carefully combined to ensure that redundancies are eliminated as well as that unique items are not unintentionally combined. Furthermore, since each resulting schema is unique, a new set of software tools must be created or configured to generate useful reports and analysis from the combined data.

There remains a need for an improved technique for migrating data from disparate data sources into a single data source suitable for business analysis.

SUMMARY

A data migration technique presumes a schema suitable for combining data sources in a business environment. This presumptive approach to data migration permits the development of rules and libraries specifically adapted to move data from various sources into the schema, and advantageously permits formal realization of experience that has been developed over years of work in translating various data sets to the schema. As a result, data migration can become highly automated, and the timeline for migration can be reduced from months to days or hours. This approach also permits the creation of universal analytical and transactional business tools that operate from the fixed, presumptive schema.

BRIEF DESCRIPTION OF THE DRAWINGS

The present disclosure may be better understood and its numerous features and advantages made apparent to those skilled in the art by referencing the accompanying drawings wherein.

DETAILED DESCRIPTION

Described herein are systems and methods for mapping enterprise data from a plurality of disparate data sources into a combined database suitable for analyzing the enterprise data. However, it will be appreciated that the principles of the system described herein may be adapted to other applications where source data is physically or logically distributed over a number of different databases, such as managing medical information, or synthesizing experimental data in a research environment. These and other applications not specifically described below are intended to fall within the scope of the systems and methods described herein.

Figure 1:
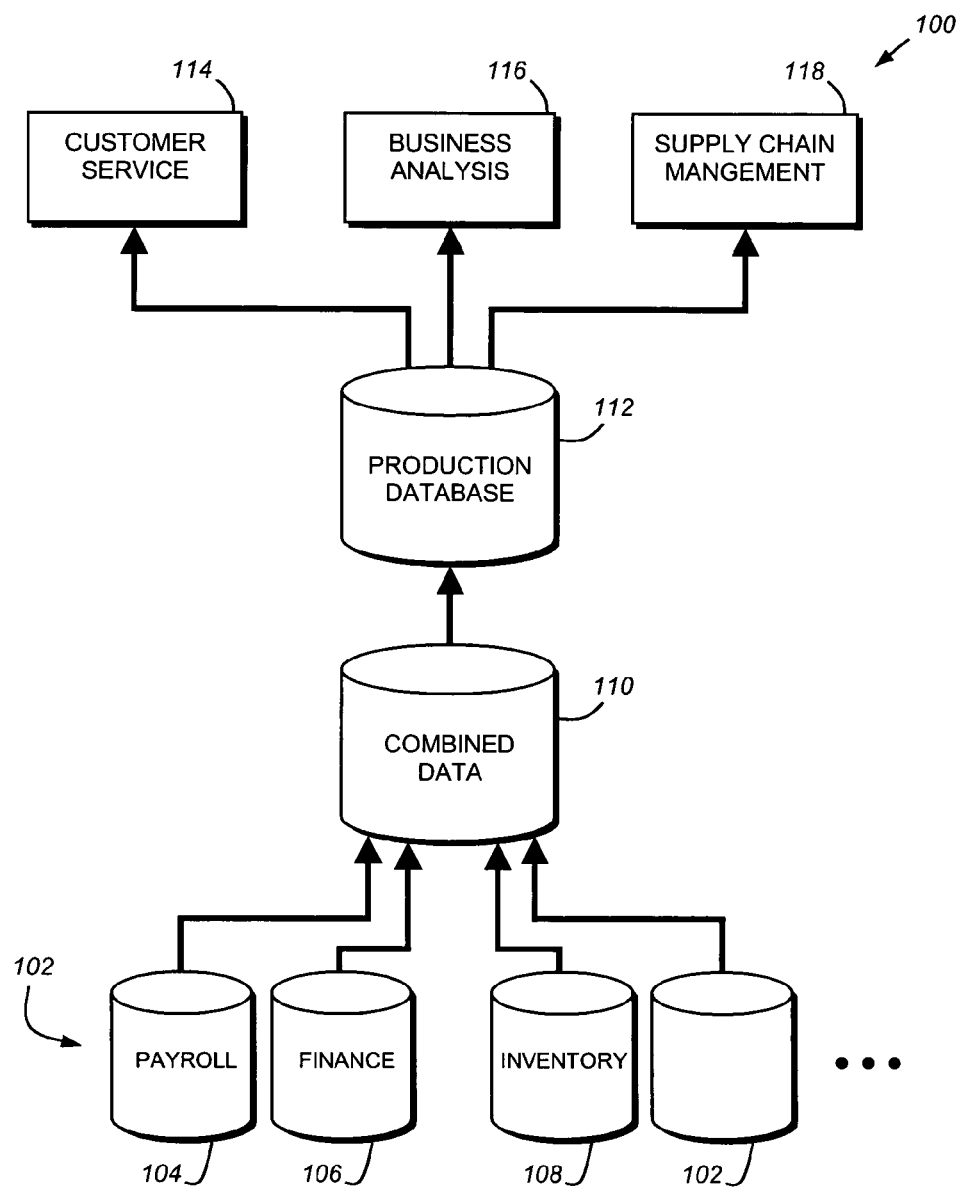
FIG. 1 shows the entities in a data migration process.

FIG. 1 shows the entities in a data migration process. The system 100 may include source databases 102 such as a payroll database 104, a finance database 106, an inventory database 108, and/or any other databases 102 used by an enterprise, as well as a combined database 110, a production database 112, and one or more applications running off of the production database 112, such as a customer service application 114, a business analysis application 116, and a supply chain management application 118. It will be appreciated that, while the term, "data migration", and similar terms are used throughout, and that these terms are a useful description for certain aspects of the system 100, the system 100 as properly understood includes data migration, data structures, ongoing or continuing data processing for new data, and data analysis tools, as well as other features that are intended to fall within the scope of the inventions described and claimed herein.

The source databases 102 may be any databases used by an enterprise, and may be built upon various database technologies including generic database technologies such as Microsoft SQL Server, Microsoft Access, Oracle 9i, SQL Server, IBM DB2, or MySQL, as well as specialized data management applications such as Fourth Shift, and any other structured data, including e-mail records, spreadsheets, charts, tables, or any other data having a structured format. The source databases 102 may include the payroll database 104, the finance database 106, and the inventory database 108, as noted above, as well as numerous databases that have not been explicitly depicted, such as employee records, customer data, accounts receivable, supplier information, or any other enterprise resource planning data or other database relating to any business or record-keeping function. Each source database 102 may further include more than one separate database, distributed, for example, according to business unit, geographical location, or some other characteristic. Specialized applications used for specific business functions such as payroll, accounts receivable, inventory, and so forth may maintain proprietary databases which may also be used as source databases 102 with the system 100 described herein. More generally, any source of structured data, or other application environment or system used to store data or information may be considered a database as that term is used herein.

The combined database 110 may be any single repository for receiving all of the data from the source databases 102. In one embodiment, the combined database 110 is maintained as an SQL Server database. The data may be transferred from the source databases 102 to the combined database 100 using a number of techniques. For example, the data may be transferred over a data network using File Transfer Protocol ("FTP"), or a data or telecommunications network using any other transfer technique suitable for moving large amounts of data. Other techniques may also be employed, such as transferring the data to tapes that are physically transmitted from one or more locations to the site of the combined database 110. The combined database 110 may serve as an intermediate data repository that provides a single reference database for generating the production database 112.

The production database 112 may be generated from the combined database 110. The production database 112 may serve as a database to support one or more applications that provide analysis and monitoring of business functions and data. The production database 112 may include a schema tuned for business analysis applications (e.g., organized with indices for anticipated queries), and may be based upon any database technology having capacity and speed suitable for the intended applications. The processes for translating the combined database 110 into the production database 112 are described in greater detail below with reference to FIG. 2. In general, once a complete mapping is provided from the source databases 102 to the production database 112, the production database 112 can be updated with a modest investment of time and processing resources. However, it will be appreciated that is also possible to provide live or continuous updates, such as by streaming updates to the source databases 102 as a series of transactions or messages from the source databases 102 or their associated software.

The applications running off of the production database 112 may include, for example, the customer service application 114, the business analysis application 116, and the supply chain management application 118, as well as any other applications suitable for using the production database 112. In general, these applications may be stand alone applications that interface with the production database 112, or the applications may be provided in a web-accessible form as a web page from a web server, with the web server maintaining back-end service to the production database 112. Such a web-accessible system may include well known authorization and security features so that only certain users can access certain web pages and/or access certain data in the production database 112.

The customer service application 114 may include, for example, functionality for order entry, customer service, technical support, contract management, or any other tasks or features useful in a customer service environment. For example, the customer service application 114 may provide features to assist in order entry, such as performing product searches, calculating order prices, and viewing customer order and payment history. The interface provided by the customer service application 114 may provide for data entry that is transmitted either immediately or at some future time back to the production database 112 or one of the source databases 102.

The business analysis application 116 may be configured to provide raw or processed data relating to the business. The application 116 may also provide alerts, pre-configured reports, or other data analysis tools including the capability to retrieve and view raw data underlying reports. Reports may include, for example, sales reports, inventory reports, and accounts receivable reports. Data may be investigated in greater detail, with information reported with greater granularity, such as on a per-product, per-customer, or per-salesperson basis. In another aspect, the application 116 may generate reports or updates on important business metrics, provided that the data migration path from the source databases 102 to the production database 112 is maintained on some continuous or periodic basis.

The supply chain management application 118 may include functionality for reviewing work-in-progress, quality assurance, order fulfillment, shipping, invoicing, and so forth. This application 118 may also provide tools for supply chain functions such as optimizing the supply chain, reviewing performance of suppliers, and scheduling and organizing new product development.

All of the applications described above, and other possible applications, may be run from a production database 112 that combines data from all of the disparate databases maintained by an entity. The production database 112 may be advantageously designed and tuned for a fixed set of applications, so that the migration process automatically results in an efficient database of migrated data, regardless of the structure and arrangement of the source databases. As another advantage, migrating to a fixed target schema may permit experience obtained from previous data migrations to be captured and applied to future migrations to improve the migration process, as described in greater detail below. It will also be appreciated that applications that run from the production database 112 may be available for use as soon as the migration process is completed.

Furthermore, if the source databases 102 do not change in structure, then the mappings obtained through the process described below may be applied repeatedly to update the production database 112 on any desired and practicable interval, such as hourly, daily, or weekly. In a messaging or other streaming environment, the production database 112 may be updated in real time, or near real time, with new entries and transactions posted to the production database 112 moments after they occur. In this manner, the production database 112 may provide timely data for business analysis performed using the above applications 114, 116, 118.

A process for migrating data to the production database 112 is now described in greater detail.

Figure 2:
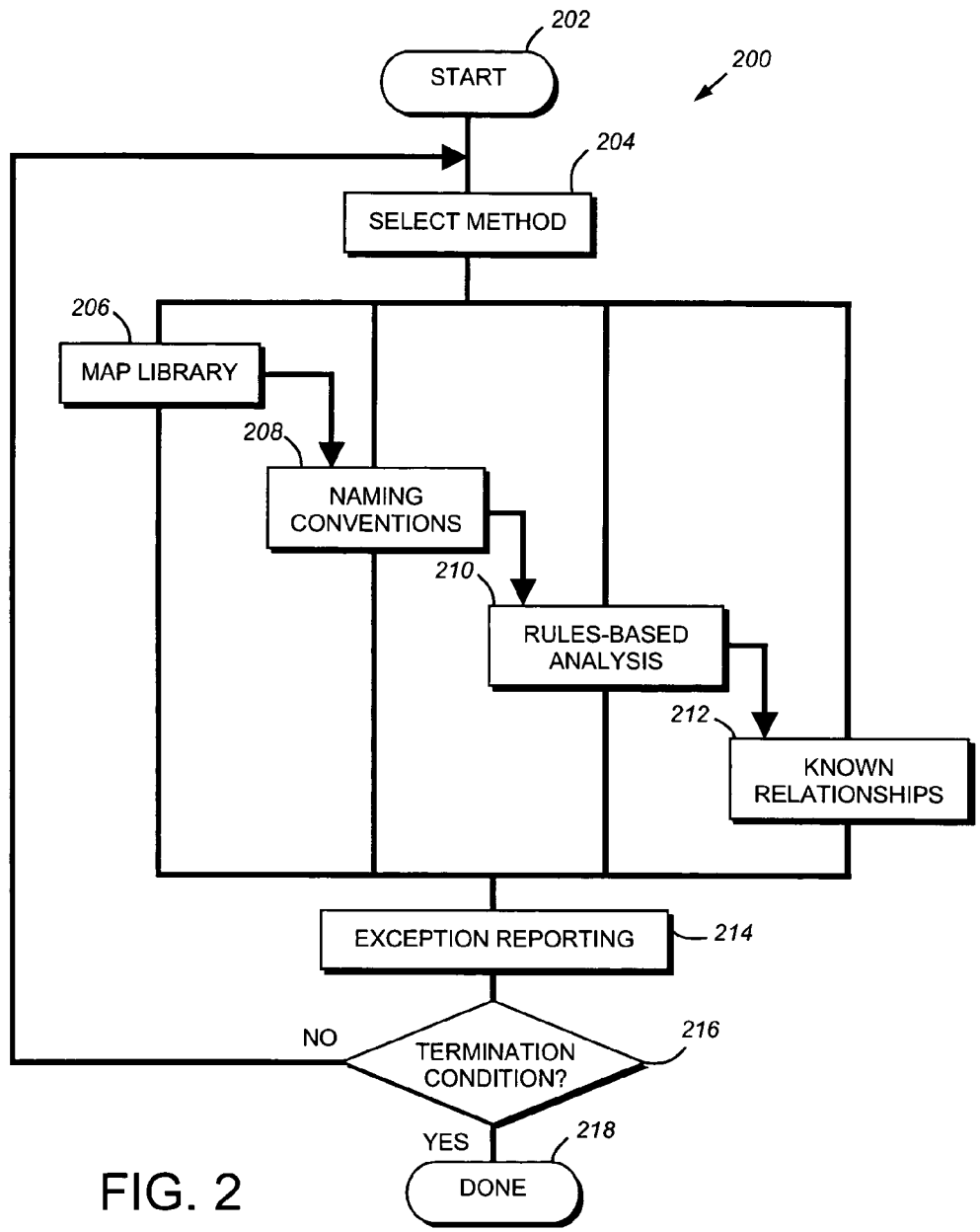
FIG. 2 shows a process for migrating data to a production database.

FIG. 2 shows a process for migrating data to a production database 112. It is assumed in the following discussion that entity-wide data has been transferred to the combined database 110 depicted in FIG. 1. While this is an efficient technique for processing all entity-wide data, it will be appreciated that other approaches may be used, such as directly accessing the source databases 102 during processing. It is also assumed that the production database 112 has a known, fixed structure.

It will be appreciated that the process 200 may be realized in hardware, software, any some combination of these suitable for handling the associated databases. The process 200 may be realized in one or more microprocessors, microcontrollers, embedded microcontrollers, programmable digital signal processors or other programmable device, along with internal and/or external memory. The process 200 may also, or instead, include an application specific integrated circuit, a programmable gate array, programmable array logic, or any other device that may be configured to process electronic signals. It will further be appreciated that the above process 200 may be realized as computer executable code created using a structured programming language such as C, an object oriented programming language such as C++, or any other high-level or low-level programming language (including database programming languages and technologies) that may be compiled or interpreted to run on one of the above devices, as well as heterogeneous combinations of processors, processor architectures, or combinations of different hardware and software.

The process 200 may start 202 by selecting a mapping method, as shown in step 204. The methods used may include applying a map library 206, applying naming conventions 208, applying rules-based analysis 210, and applying known relationships 212. While these are depicted in a particular order, it will be appreciated that these methods may be applied in different orders, and that two or more of these methods may be applied sequentially (as indicated in FIG. 2 by intermediate arrows which illustrate one possible order of application) or repetitively without deviating from the scope of the systems described herein. Further, it will be appreciated that the methods may be selected automatically, or under supervision by a user such as through the user interfaces depicted in greater detail below.

As shown in step 206, the process 200 may apply a map library. The map library may contain mappings of data elements in a source database to data elements in the production database. These mappings may be acquired over time through previous data migration projects where data has been mapped to the schema of the production database. In these cases, where a known mapping is identified, all of the associated source data may be migrated directly to the production database without further processing. This technique is particularly useful when addressing data from database vendors who provide standard database solutions for particular business purposes, such as Fourth Shift enterprise resource planning from Brand Soft, or the contacts maintained by Microsoft Outlook. These databases may be identified by the process 200, and previous mapping data that is maintained in the map library may be used to migrate data into the production database on the basis of the prior mapping. Automatic identification may be performed, for example, using the title for a source database, meta-information contained within a source database, or a comparison of data structures in the map library to data structures in the source database. Manual identification may also be performed through a user interface as discussed below. In the event that a source database has been somewhat customized, exceptions may be reported as described in more detail below in reference to step 214.

As shown in step 208, the process 200 may apply naming conventions to map some or all of the source data into the schema of the production database. A number of different naming convention libraries may be employed, either together or at different times. For example, a first naming convention library may relate data labels in the source data to data labels in the schema. A second naming convention library may relate table names in the source data to table names in the schema.

A table library may take advantage of common nomenclature used for tables in database design. Thus, while there may be hundreds of ways to entitle a customer information table, only a few dozen, or a dozen, or less, may actually be used in practice. Each time a migration is performed, any table that corresponds in whole or in part to a table in the schema may have it's title and the associated mapping added to the table library for use in future migrations. To apply the table library to new data, table names of the source data in the combined database may be scanned and compared to table names in the table library.

A data label library may similarly exploit common nomenclature used in naming data elements. For example, an account balance field within the schema of the production database may find its corresponding data element in a field labeled "account_balance", "accountbalance", "AccountBalance", "bal_due", or "current_balance", or other similarly labeled fields. To apply the data label library to new data, names of data elements, e.g., columns, may be scanned and compared to data labels in the data label library. Once a corresponding data element (or table for the table library) is identified, the associated rows and columns of the source data may be migrated to the production database. As with the table library, the data label library may be updated after each data migration to the schema so that new mappings identified during a data migration are preserved for future use.

The data label library mapping process may add data to ensure the uniqueness of each record when combining data from various sources. This may arise, for example, where multiple tables have the same structure, but come from different geographic locations of a business. When such tables are joined during the data migration process, they may have identical data in one or more fields of one or more records that could otherwise be mistaken as redundant data, so a new data type, such as a location identifier, may be added.

It will be appreciated that use of naming convention libraries improves with successive migrations. Each successful mapping may be stored in one of the libraries, and over time, a set of empirical mapping rules may be developed to increase speed and automation of the migration process. In the event of exceptions or a failure to map specific data elements, manual identification may also be performed through a user interface as discussed below. To the extent that such exceptions occur, the manner in which they are handled may serve to improve automated mapping by improving the underlying naming convention libraries.

As shown in step 210, a rules-based analysis may be performed including application of one or more rules for mapping data. A variety of rules-based strategies for identifying data types are known, and may be used with the systems described herein and may be realized in software and/or hardware as a rules engine. Examples are provided below, although it should be appreciated that these examples are illustrative rather than exhaustive.

One type of rule may exploit data characteristics. For example, a number including a decimal point and two trailing digits is likely to be a dollar amount such as a price. Proper names also have common characteristics. Some names may be identified using a look-up table, others may be identified as a capitalized word next to another capitalized word or an initial. A name may be further characterized as, e.g., a customer contact or an employee based upon the table where it is found. Zip codes are typically five digits (or five plus four), and may be identified on the basis of their format, as may telephone numbers.

One type of rule may exploit proximity of data. So for example, where a customer identification and a price are located in a table, it is also likely that a product identification or a customer name will be located in that table. Similar inferences can be drawn for a variety of data elements. For example, where a part number is found, there may also be ship-to information. Where a customer name and an address are present, a five digit number is likely a zip code. Where two zip codes are found in a table, one reasonable inference may be that they correspond to a bill-to address and a ship-to address.

One type of rule may de-duplicate data by replacing equivalent terms, e.g., "IBM", "I.B.M.", or "International Business Machines", with a common representation.

Some rules are deterministic. For example, where a price and a number of units are found for an order, the total dollar amount for the order is also known, and may thus be located within a table on the basis of its expected value.

Some rules may be based on table size and structure. For example, a table with a relatively small number of rows is likely to indicate a master table for a database.

Rules of the type identified above, and other rules may be formalized in any suitable programming language and applied to sort through data from the combined database. Any rule may be suitably applied, provided it can be articulated in an executable form. It will be appreciated that, particularly for rules that draw inferences about data organization and type, the process 200 may benefit from combinations of rules as well as numerous passes through the data in which inferences may be progressively refined.

As shown in step 212, the process 200 may exploit known relationships in the data of the combined database. Known relationships may be identified in a number of ways.

One approach is to infer known relationships from a user interface for an application that accesses the source database(s). Information may be gathered from a screen shot of the user interface or by manually operating the interface. It is possible, for example, to view an active user interface for one or more of the source databases and call up information on a particular customer order. From this display, specific data items may be identified, including important information such as a customer identification number, an order identification number, one or more product names or product descriptions, and so forth. Data identified in this manner may be located in a database and the corresponding field labeled accordingly. Thus, a customer for whom data migration services are being provided may simply provided one or more screenshots that associate particular values with important fields within the customer's database(s).

Similarly, known relationships may be obtained through customer interviews or other processes. However obtained, the known relationships between specific values and fields within the customer database(s) may then be used to label data elements during a data migration process.

As shown in step 214, the process 200 may provide exception reporting. Exception reporting may be provided periodically during the process 200, such as each time that a method is selected and applied, or after all of the methods have been applied, or whenever a certain number of exceptions have accumulated, or at any other suitable time during the process 200. Optionally, exception reporting may be reserved until the process 200 has completed, although empirically it has been noted that the process 200 may be usefully supplemented by addressing exceptions during the process 200.

The exceptions may be reported within a user interface that permits a user to address exceptions by providing labels from those available within the production database, or by changing associations created during the process 200.

As shown in step 216, a termination condition may be tested for. This may be, for example, any condition used by the process 200 to determine whether further automated processing will improve the quality of the data mapping, either in terms of accuracy or completeness, such as when successive passes through the source data fail to yield any additional mapping of data elements. Optionally, the termination condition may simply be completion of a certain number of iterations of one or more of the methods applied by the process 200, or the termination condition may be a user request for termination. Although a single termination condition is depicted, it will further be appreciated that numerous interruptions may occur to an automated process that prompt for user selections or input. Thus, a number of sequential termination conditions may arise during a particular data migration process.

It will be appreciated that the steps of the process 200 may be varied, or their order modified, without departing from the systems described herein. For example, exception reporting may occur before or after a termination condition, or the process may operate with no termination condition, relying instead on a fixed number of iterations through one or more of the methods described. Similarly, exception reporting may be omitted entirely where, for example, a direct data load is desired for analytical or client presentation purposes. Naturally, omitting this step may result in a production database that has significantly lower quality, however, analysis of the resulting data quality may be a useful benchmark for the source data. Other steps may be added to the above process 200, such as normalization and cleansing of data, or any other steps known to those of skill in the database programming and data migration arts that can be usefully applied to the systems described herein.

Certain views of a user interface will now be described in greater detail. These views depict certain features and functions described above, and may be used with a system as generally described herein. The user interface may be provided as an application, or as a web-based system where remote access is provided through one or more web pages. The web-based system may be secured using conventional techniques to prevent unauthorized access to the data migration process or related data. It will be appreciated that the user interfaces depicted below are examples only, and that a wide variety of arrangements of data, controls, and links may be usefully employed with the systems described herein.

Figure 3:
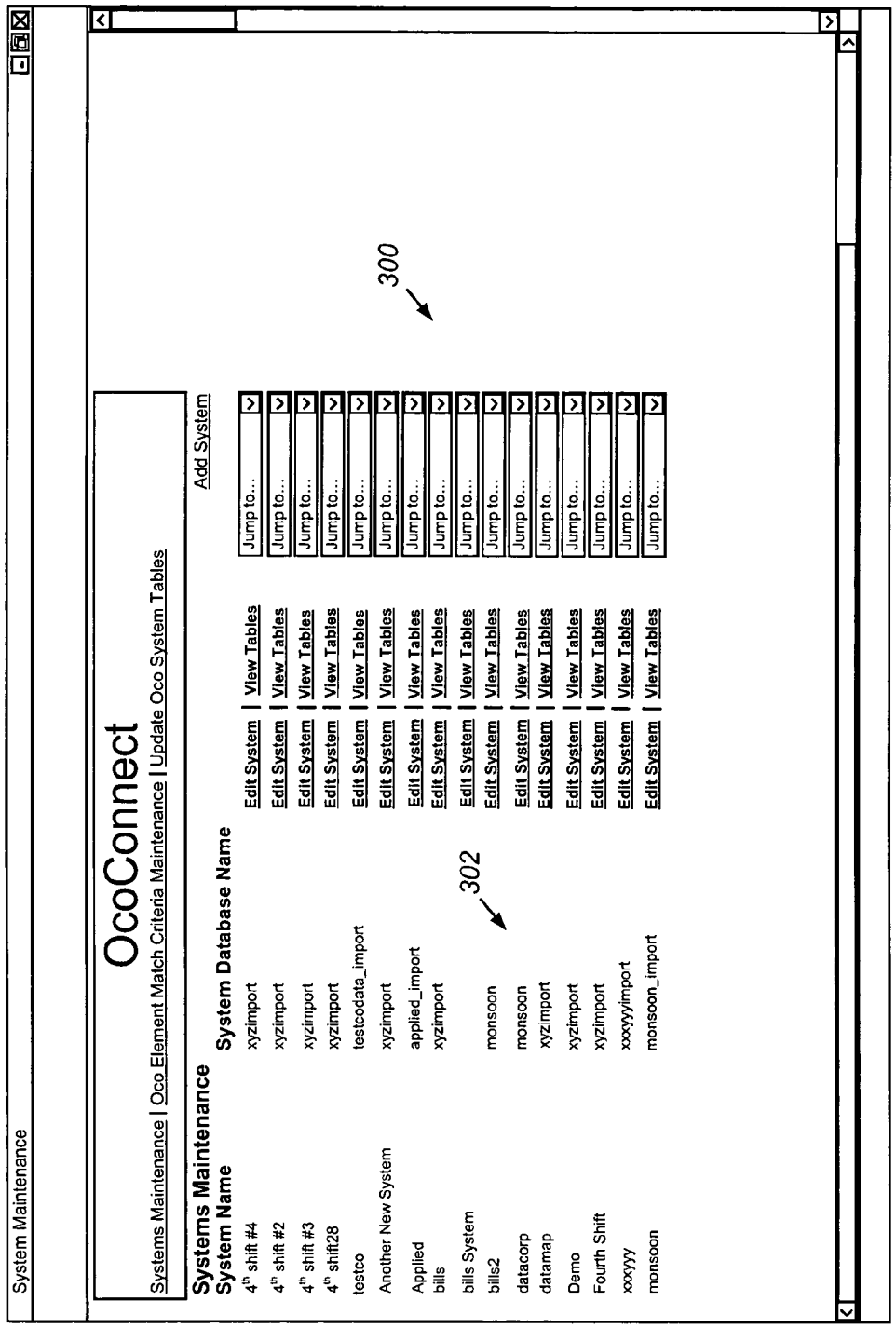
FIG. 3 depicts a user interface for use with a data migration system.

FIG. 3 depicts a user interface for use with a data migration system. In this user interface 300, map libraries 302 are depicted in columns along the left-hand side of a display. On the right-hand side of the display, links are provided to other interface pages where tables associated with a map in the map library may be viewed or edited. A drop down menu or other control may permit access to other features and functions within the system, as applied to a particular database within the map library.

Figure 4:
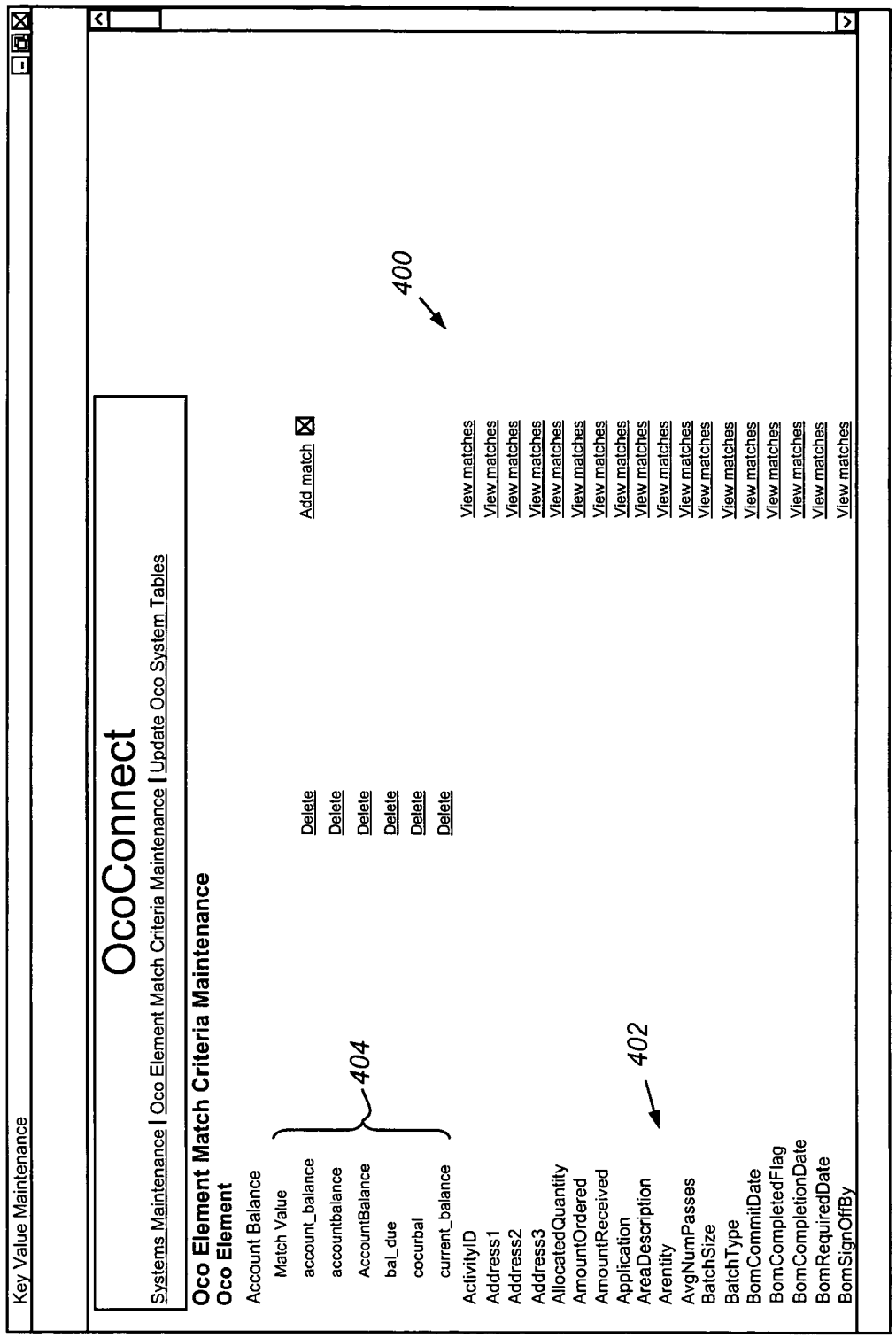
FIG. 4 depicts a user interface for use with a data migration system.

FIG. 4 depicts a user interface for use with a data migration system. In this user interface 400, data labels that have been matched using data label libraries are displayed for review or editing. The data labels 402 from the production database (described above) are depicted in a column along the left-hand side of a display. Each data label may be expanded, as labeled generally by element number 404, to display various labels within the source databases that have been associated with that data label. A particular association may be deleted or added using controls provided within the user interface 400.

Figure 5:
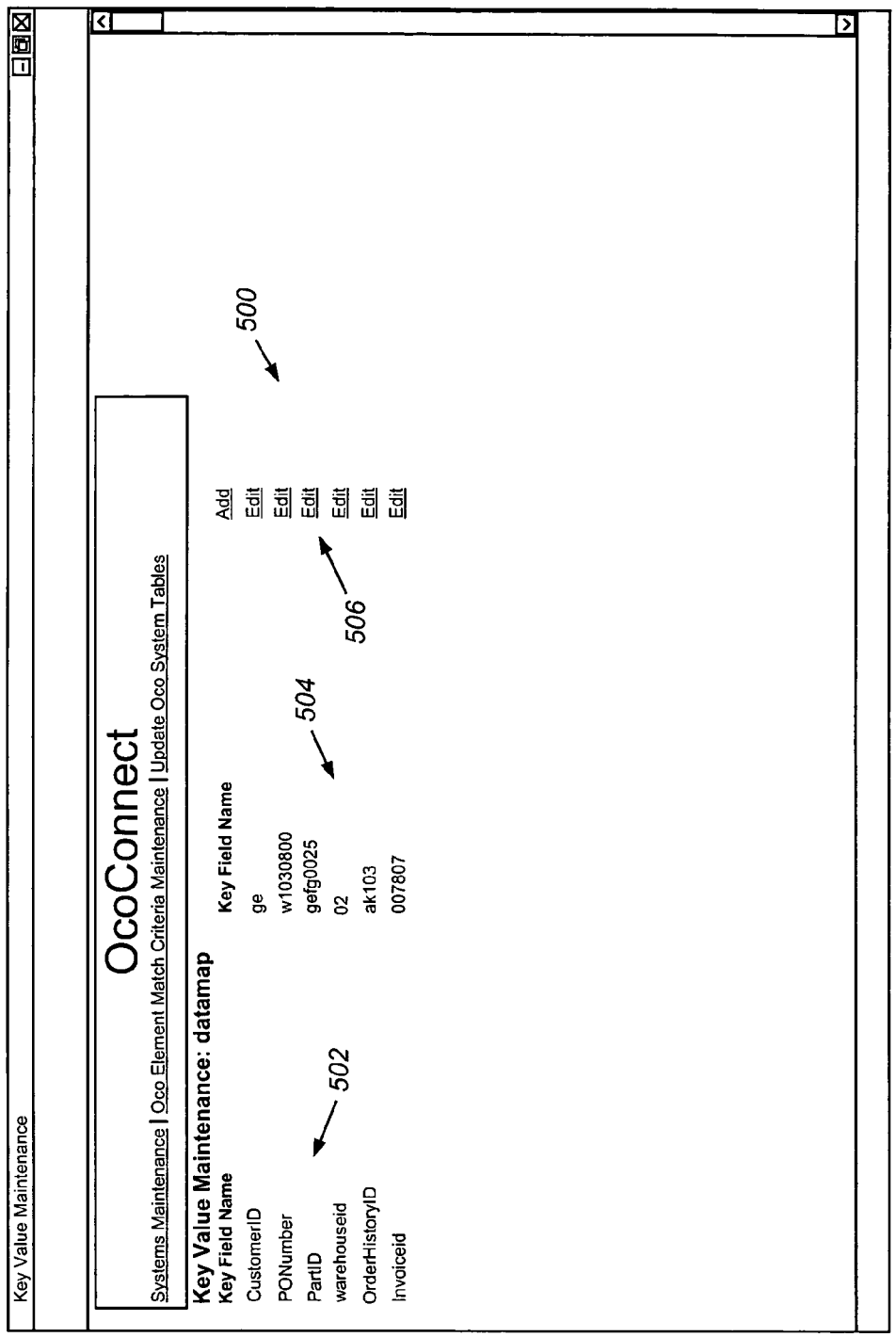
FIG. 5 depicts a user interface for use with a data migration system.

FIG. 5 depicts a user interface for use with a data migration system. In this user interface 400, data for various key fields within the source data are displayed. Through this interface 400, a user may specify known values for certain data elements within the source database. Key fields 502 within the production database may be displayed on a left-hand side of the interface 400. Known values 504 for each key field 502 may be displayed in a central column within the interface 500.

An edit link 506 may be provided for each entry, to permit deletion or revision of data for each key field 502.

A user may acquire data for entry into the interface 400 from within an application running on the source databases, for example, where elements of the application's interface (e.g., a text box labeled "customer number") and associated data (e.g., a number appearing within the text box) may be used to obtain useful data points for the migration process. One or more screen shots from the live application may be transmitted electronically to a user of the data migration system. Optionally, a user of the source databases may be surveyed concerning representative values for certain data elements. These data points may be used as described above to identify important data elements within the source databases and map them to data elements within the production database schema.

Figure 6:
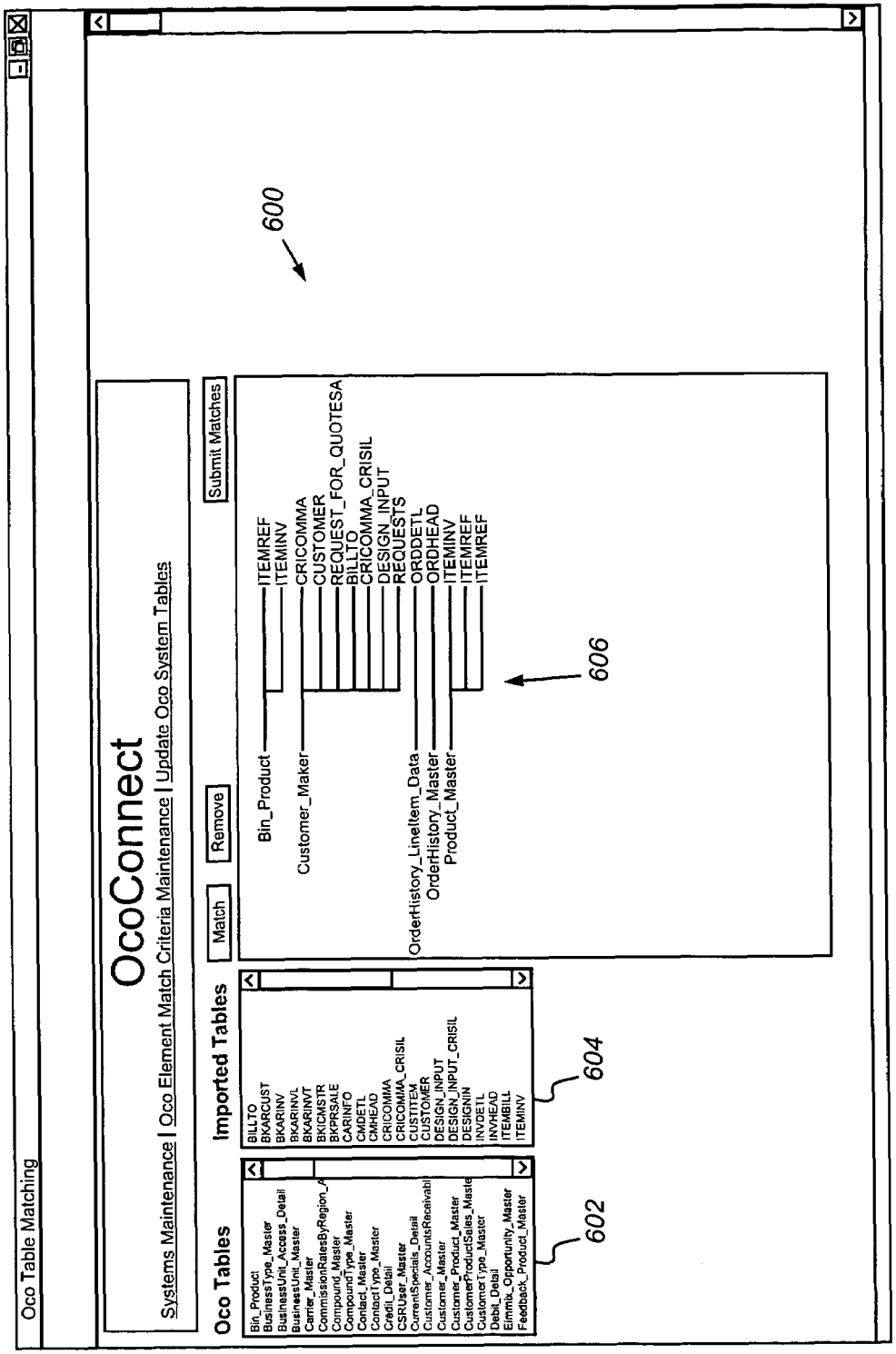
FIG. 6 depicts a user interface for use with a data migration system.

FIG. 6 depicts a user interface for use with a data migration system. In the user interface 600, tables in the production database 602 and tables within the source databases 604 may be graphically displayed, along with proposed associations 606 for mapping. The proposed associations may be reviewed, edited, or deleted by a user, either during a data migration process or after a data migration process is complete. As may be seen from FIG. 6, a table within the production database 602 may have more than one corresponding table within the source databases 604, such that tables must be joined or otherwise combined during data migration.

Figure 7:
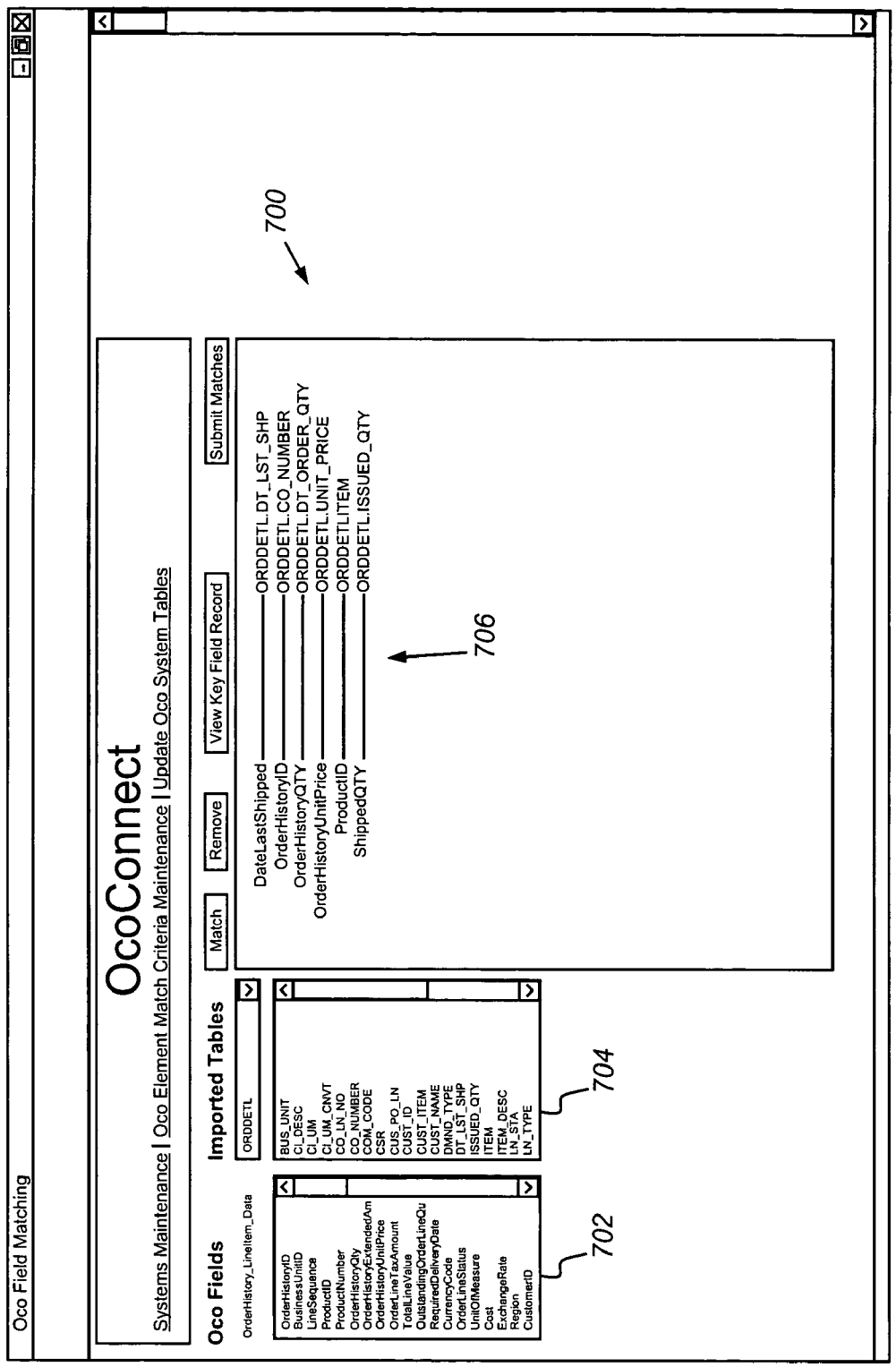
FIG. 7 depicts a user interface for use with a data migration system.

FIG. 7 depicts a user interface for use with a data migration system. In the user interface 700, fields in the production database 702 and fields in the source databases 704 may be graphically displayed, along with proposed associations 706 for mapping. The proposed associations may be reviewed, edited, or deleted by a user, either during a data migration process or after a data migration process is complete.

Figure 8:
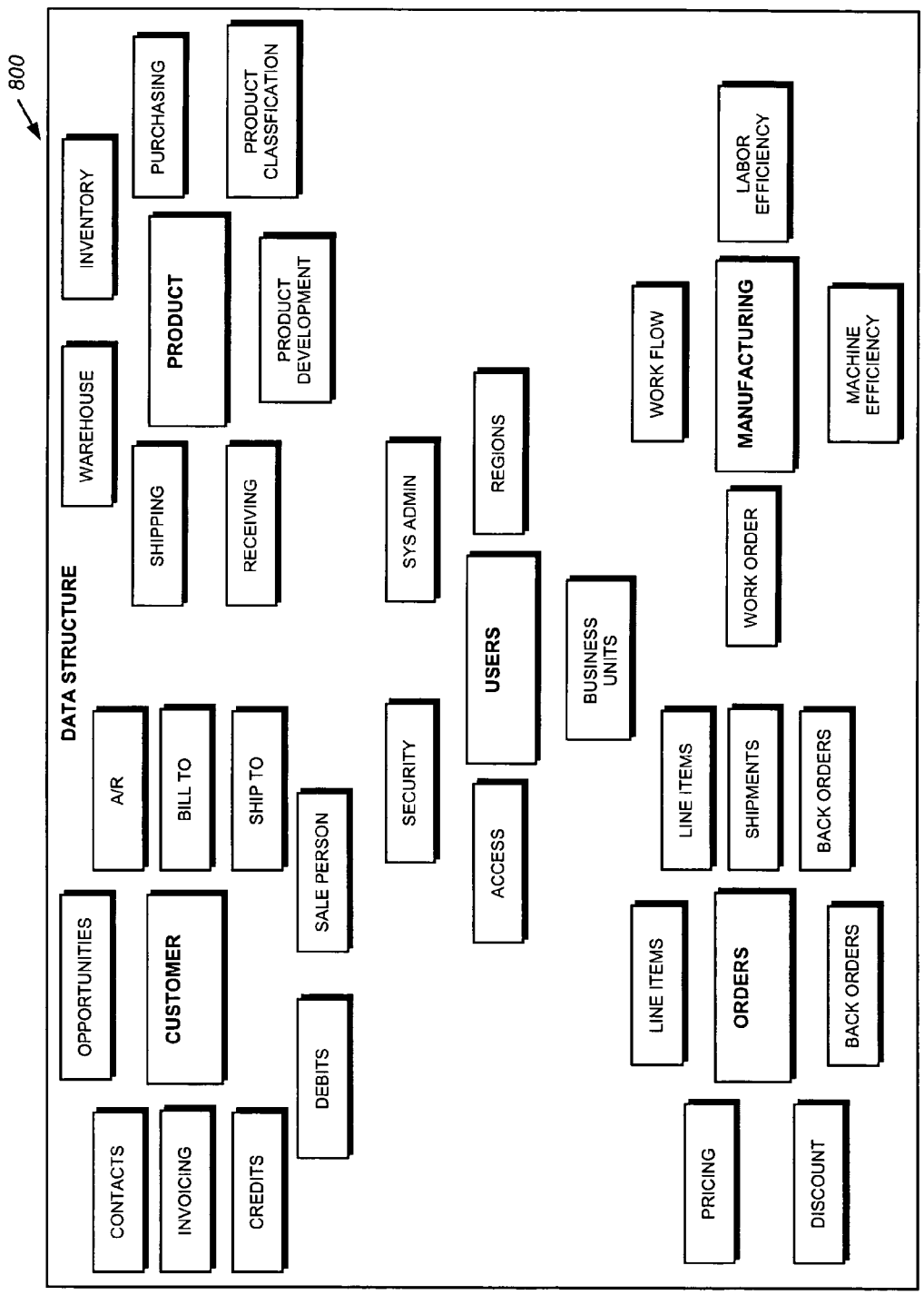
FIG. 8 shows a data structure for use with a data migration system.

FIG. 8 shows a data structure for use with a data migration system. In particular, FIG. 8 depicts, at a top level, a schema for organizing business data, and is set forth as an example of how a fixed target schema may be organized. The data structure 800 is intended to be useful for a variety of different business types, including a service business, a manufacturing business, a retail business, and so forth.

Within the data structure 800, details such as pricing may be addressed in the structure of certain tables. For example, a base pricing may be the listed unit price for an item. In a pricing model, the price may be discounted according to quantity or according to the customer, or both. Pricing may also be affected by factors such as exchange rates, special product offerings with associated offer codes, or other factors. The following tables may be used to accommodate these various pricing structures:

TABLE 1

Product Master

Productid
Business Unit
Unit of Measure
Product Description
Product Cost
Product Unit Price

TABLE 2

Product Pricelist Detail

Productid
Business Unit
From Quantity
To Quantity
Unit Price

TABLE 3

Product Pricelist Discount Detail

Productid
Business Unit
From Quantity
To Quantity
Discount Percent

TABLE 4

Product Pricelist by Customer

Productid
Customerid
Business Unit
From Quantity
To Quantity
Unit Price

TABLE 5

Product Discount by Customer

Productid
Customerid
Business Unit
From Quantity
To Quantity
Discount Percent

TABLE 6

Product Offer Code Detail

Offer Code
Business Unit
Productid
From Quantity
To Quantity
Unit Price
Price Plan

TABLE 7

Price Plan Detail

Price Plan
Business Unit
Discount Codes

TABLE 8

Unit Of Measure Rate Detail

From Unit of Measure
To Unit of Measure
Business Unit
ConversionRate

In practice, a number of other related data structures will be included in a target schema that correspond to other aspects of businesses to which the above system might be applied. It will be appreciated that, while a schema constructed with an understanding of the business to which it will apply may operate more efficiently with application programs running off of the production database, no particular schema is required by the systems as described herein.

Where, as in the example of FIG. 8, the system is intended for use with a variety of possible businesses, the target schema may usefully reflect the various potential businesses and business models that might apply. Optionally, the target schema may be informed by an understanding of a particular business and designed for that business type, e.g., retail, services, manufacturing, and so forth. In general, the target schema may be organized so that business logic, analysis, and transactions can be efficiently managed using a production database built on the schema. The design and use of such data structures is well known to those of ordinary skill in the art, and all such designs may be usefully employed with the systems described herein. Thus, while FIG. 8 is a useful high-level example, it will be readily appreciated that different schema designs may be employed, and that the production database will include additional data structures and elements not depicted in FIG. 8.

The data structures and user interfaces described above, along with other user interfaces and features, may be used to assist a user in migrating data using the techniques described herein. Thus, there is described a system for migrating data from a plurality of disparate data sources into a single production database for review and analysis of enterprise-wide data, as well as systems for updating data structures on a continuing bases and analyzing data so obtained. While the system has been described with reference to particular embodiments thereof, numerous modifications and variations will be apparent to those of ordinary skill in the art and are intended to fall within the scope of the inventions described herein. Thus, the invention set forth in the following claims is to be interpreted in the broadest sense allowable by law.

What is claimed is:

1. A method for transferring data comprising:
providing a plurality of source databases, each including a plurality of data elements;
providing a pre-determined schema for a data target;
transferring the plurality of data elements from the source database to a production database based on the schema, including
applying a map library having known relationships between the source databases and the schema for the data target, to the plurality of source databases to map any ones of the plurality of source databases in the map library to the schema;
applying a naming convention library to the plurality of source databases to map any ones of the data elements in the naming convention library to the schema; and
applying a rules engine to analyze data within the plurality of source databases and to draw inferences of relationships between data within the source databases and the pre-determined schema, to map one or more of the data elements to the schema using the inferences drawn from data within the plurality of source databases.

2. The method of claim 1 further comprising iteratively reapplying one or more of the map library, the naming convention library, and the rules engine until a termination condition is reached.

3. The method of claim 1 further comprising iteratively reapplying one or more of the map library, the naming convention library, and the rules engine until consecutive applications do not achieve additional data element mappings.

4. The method of claim 1 further comprising reporting exceptions where data elements from the plurality of source databases have not been mapped to the schema.

5. The method of claim 1 further comprising providing a user interface through which a user can add, delete, or modify mappings.

6. The method of claim 1 wherein the naming convention library includes one or more data label naming conventions.

7. The method of claim 1 wherein the naming convention library includes one or more table naming conventions.

8. The method of claim 1 further comprising applying known data relationships to map one or more data elements from the plurality of source databases to the schema.

9. The method of claim 8 further comprising inferring the known data relationships from a customer user interface.

10. The method of claim 8 further comprising receiving the known data relationships from a customer.

11. The method of claim 1 further comprising applying known data relationships to draw inferences about labels in the schema for unknown data in one or more of the plurality of source databases.

12. The method of claim 1 wherein the plurality of source databases include enterprise resource planning data.

13. The method of claim 1 wherein the plurality of source databases include at least one of employee records, payroll, customer data, accounts receivable, or supplier information.

14. The method of claim 1 further comprising applying the map library, the naming convention library, and the rules engine to the plurality of source databases to obtain a production database.

15. The method of claim 14 further comprising providing one or more application programs for analyzing data within the production database.

16. The method of claim 14 wherein the production database is tuned for business analytics.

17. The method of claim 14 further comprising periodically updating the production database.

18. A system for transferring data comprising:
a first [providing means] processor for [providing] communicating with a plurality of source databases, each comprising a plurality of data elements;
a [second providing means for providing] memory for storing a predetermined schema for a data target;
a first applying processor means for applying a map library having known relationships between the source databases and the schema for the data target, to the plurality of source databases to map any ones of the plurality of source databases in the map library to the schema;
a second applying processor means for applying a naming convention library to the plurality of source databases to map any ones of the data elements in the naming convention library to the schema;

a third applying processor means for applying a rules engine to analyze data within the plurality of source databases and to draw inferences of relationships between data within the source databases and the predetermined schema, to map one or more of the data elements to the schema using the inferences drawn from data within the plurality of source databases; and a production database storing a plurality of data elements transferred from the source databases and stored in an organization representative of the schema for the data target.

* * * * *

UNITED STATES PATENT AND TRADEMARK OFFICE
CERTIFICATE OF CORRECTION

| | | |
|---|---|---|
| PATENT NO. | : 7,457,807 B2 | Page 1 of 1 |
| APPLICATION NO. | : 10/755142 | |
| DATED | : November 25, 2008 | |
| INVENTOR(S) | : George W. O'Conor | |

It is certified that error appears in the above-identified patent and that said Letters Patent is hereby corrected as shown below:

In the Claims:

In Claim 18, column 12,

Line 56:   please delete "[providing means]" and "[providing]"

Line 59:   please delete "[second providing means for providing]"

Signed and Sealed this

Fifteenth Day of June, 2010

David J. Kappos
*Director of the United States Patent and Trademark Office*